United States Patent [19]

Bateman et al.

[11] 4,047,027

[45] Sept. 6, 1977

[54] NEUTRON WELL LOGGING TECHNIQUE FOR GAS DETECTION

[75] Inventors: Richard M. Bateman, Chicago, Ill.; Christian M. Clavier, Ridgefield, Conn.

[73] Assignee: Schlumberger Technology Corporation, New York, N.Y.

[21] Appl. No.: 671,905

[22] Filed: Mar. 29, 1976

Related U.S. Application Data

[63] Continuation of Ser. No. 585,738, June 10, 1975, abandoned.

[51] Int. Cl.$^2$ .............................................. G01V 5/00
[52] U.S. Cl. .................................. 250/264; 250/266; 250/269
[58] Field of Search .............. 250/252, 261, 262, 264, 250/265, 266, 269, 270

[56] References Cited

U.S. PATENT DOCUMENTS

| | | | |
|---|---|---|---|
| 3,701,902 | 10/1972 | Janssen et al. | 250/265 |
| 3,789,219 | 1/1974 | Wilson | 250/270 X |
| 3,833,809 | 9/1974 | Beil | 250/270 |
| 3,842,265 | 10/1974 | Pitts, Jr. | 250/270 |

Primary Examiner—Davis L. Willis

[57] ABSTRACT

In accordance with an illustrative embodiment of the present invention, a technique is disclosed for determining a characteristic of an earth formation by irradiating the formation with a source of neutrons and measuring the resulting neutron population at two different spacings from the source. Each neutron population measurement is converted into a signal which is related to the formation porosity corrected for environmental effects. The two converted signals are then compared with the porosity derived from the ratio of the two neutron population measurements in order to obtain an indication of the presence of gas in the formation.

19 Claims, 11 Drawing Figures

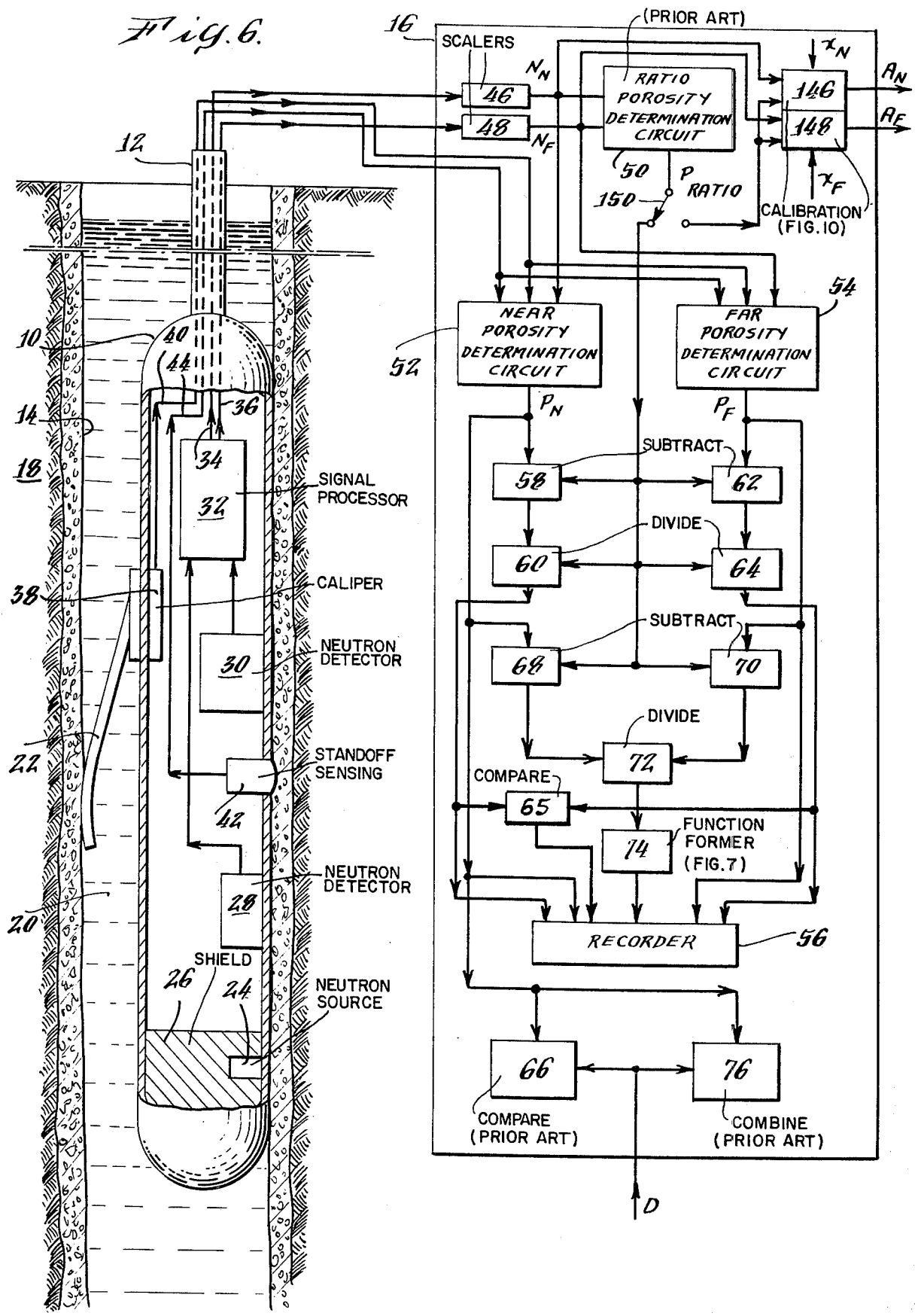

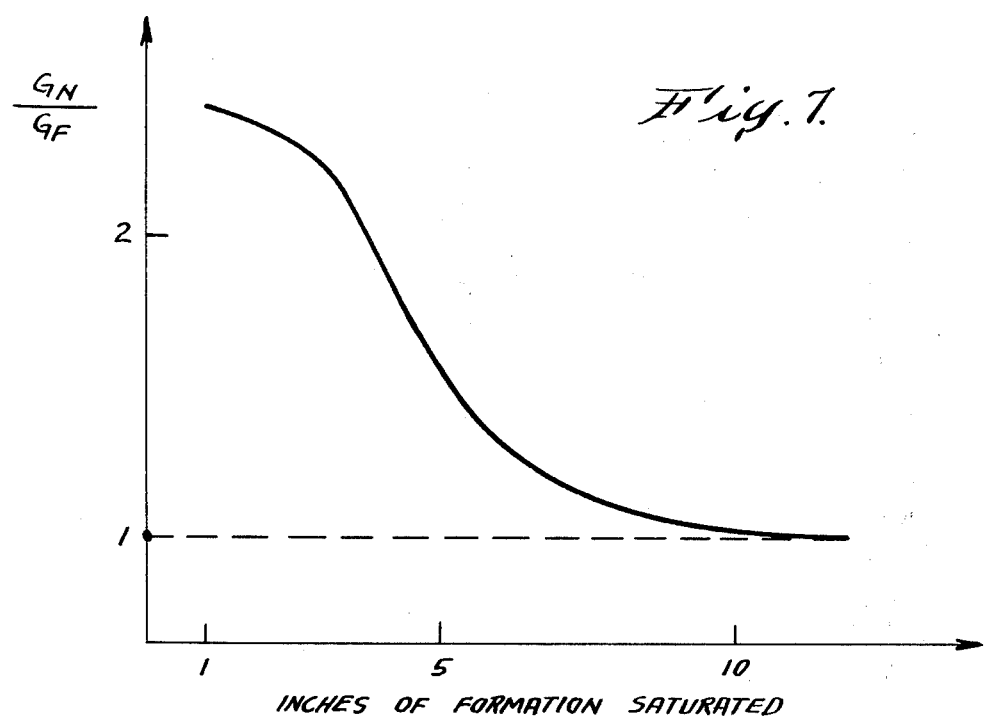
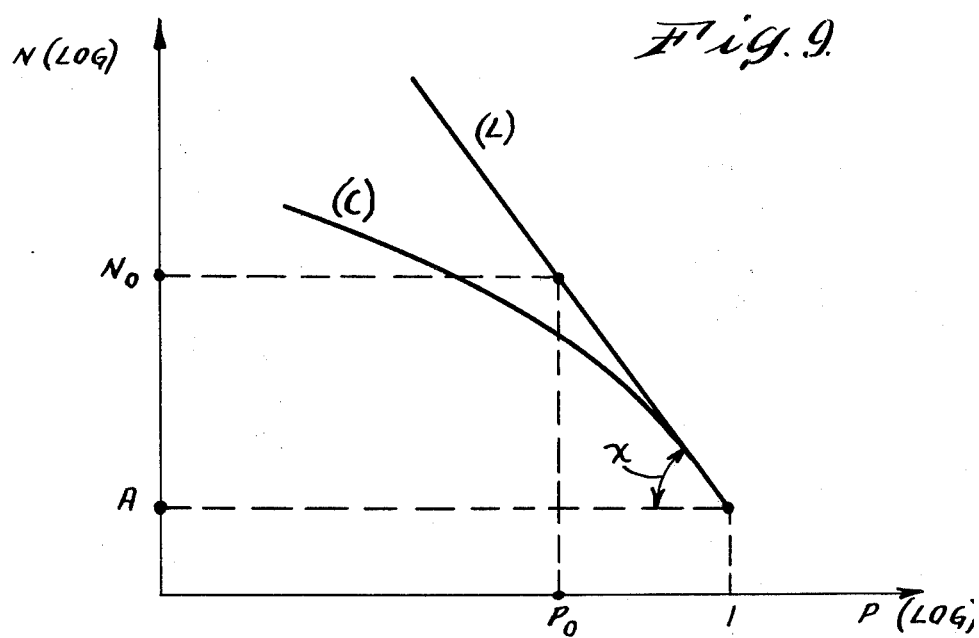

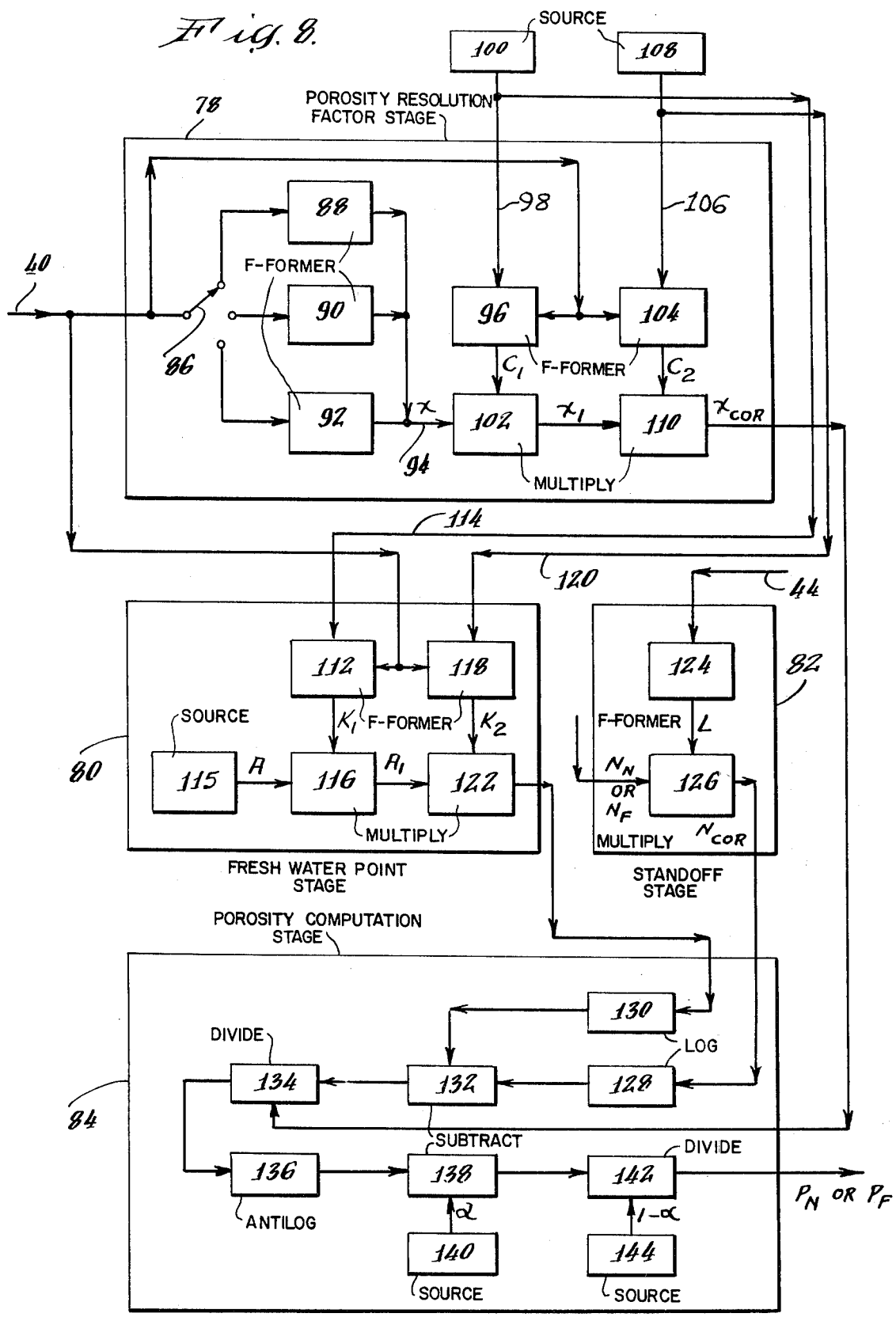

NEUTRON WELL LOGGING TECHNIQUE FOR GAS DETECTION

This is a continuation, of application Ser. No. 585,738, filed June 10, 1975 and now abandoned.

BACKGROUND OF THE INVENTION

1. Field of the Invention

This invention relates to well logging methods and apparatus and, more particularly, to methods and apparatus for determining characteristics of the earth formations surrounding a borehole by irradiating the formations with neutrons and measuring the resulting spatial distribution of the neutrons within the formations. The subject matter of this invention is related to subject matter described in copending U.S. Application Ser. No. 671,904 of Yves Boutemy and Christian M. Clavier, filed of even date herewith and assigned to the same assignee.

DESCRIPTION OF THE PRIOR ART

A knowledge of the porosity of the formations surrounding a borehole is of fundamental importance in the oil industry. Porosity data is needed not only to identify possible oil or gas producing horizons, but also to calculate other important parameters, such as the maximum producible oil index of a specific formation.

Porosity measurements are generally performed by a dual-detector neutron porosity logging tool provided with a neutron-emitting source that continuously irradiates the formation under study. The resulting neutron population is sampled by a pair of neutron detectors spaced at different distances from the source. The ratio of the counting rates from these detectors is computed and, with appropriate corrections, converted into a signal that corresponds to the formation porosity. A tool of this sort is described in more complete detail in U.S. Pat. No. 3,483,376 to S. Locke, patented Dec. 3, 1963.

Unfortunately, unless using a source many orders of magnitude stronger than the largest now in use, the detectors of a dual-detector neutron tool must be located at shorter spacings than would otherwise be chosen. As a consequence of the shorter source-detector spacings, the two registered counting rates are affected by porosity changes in slightly different ways. Hence, the porosity value derived from the ratio of these counting rates does not always reflect the true formation porosity.

Moreover, a dual-detector neutron tool is very sensitive to the presence of gas in the formations under investigation. If the tool is in a homogeneous bed of uniform gas saturation, both counting rates are increased because of the reduced hydrogen content of the formation. The porosity, as calculated from the ratio of these counting rates, is lower than the true porosity, but it can be corrected using the density reading of a dual-detector gamma radiation bulk density tool. A practical method for performing the correction for gas effect is described in "Computer Processed Interpretation of the Rotliegendes Formation" June 1974 — Well Evaluation Conference — North Sea. However, superimposed on this effect in invaded gas-bearing formations is the effect of the invasion profile. This means that the far detector may see a higher gas saturation than the near detector and thus read an even higher counting rate. The ratio of the counting rates, and hence the porosity derived from the ratio, drops even further. In this case, however, as the neutron tool has an appreciably deeper investigation than the density tool (this difference being a consequence of the specific spacings of each tool), the correction for gas effect is not performed in the best conditions of compatibility. As a consequence of this, accurate porosity measurements cannot always be obtained in invaded gas-bearing formations.

The presence of gas in an earth formation is often detected through a comparison of the signals acquired from a two-detector neutron porosity tool and a two-detector gamma radiation detector neutron porosity tool and a two-detector gamma radiation bulk density tool. The method is described in U.S. Pat. No. 3,566,117 to M. P. Tixier, patented Feb. 23, 1971. Due to the already mentioned lack of compatibility between the two compared readings, this method may not always lead to the best results.

A well-known method for determining the density of a formation from the count rates of two detectors located formation from the count rates of two detectors located at two different spacings from a common gamma radiation source, consists of converting said count rates into signals which are related to the formation density, comparing the converted signals to produce a correction signal representative of the difference therebetween, and adding the correction signal to one of the converted signals to produce a signal representing the true value of the formation density. The application of this method to the determination of the formation porosity from the two neutron population measurements produced by a dual-detector neutron porosity tool has been suggested in U.S. Pat. No. 3,701,902 to H. W. Janssen et al, patented Oct. 31, 1972. However, this patent does not teach how the neutron population measurements can be converted into porosity. Moreover, the above patent does not show how a dual-detector neutron tool can be used to detect gas-bearing formations.

Accordingly, it is an object of the present invention to provide an improved technique to evaluate the porosity of an earth formation.

It is another object of the invention to derive more accurate porosity measurements in invaded gas-bearing formations.

It is a further object of the invention to identify more precisely gas-bearing formations.

It is still a further object of the invention to provide an indication of the depth of invasion of a formation.

SUMMARY OF THE INVENTION

In accordance with the invention, an earth formation is irradiated with a source of neutrons and the resulting neutron population is measured at two different distances from the source. Each neutron population measured is converted into a signal which the represents formation porosity corrected for environmental effects, such as lithology, borehole size, formation water salinity, borehole fluid salinity and standoff. As a consequence of such a correction, the two converted signals are substantially the same and reflect the true formation porosity as long as the two detectors "see" the same formation, i.e., as long as there is no invasion. The so obtained porosity represents the true porosity of the formation with a much greater accuracy than the porosity derived from the ratio of the two neutron population measurements which, as already mentioned, are affected by porosity changes in different ways and the combination of which leads to the loss of a portion of the information they contain.

Preferably, the conversion of the neutron population measurements is performed by using a relationship in the form:

$$N = A[P+\alpha(1-P)]^{-x}$$

where N is the measured neutron population; A is the neutron population measured in fresh water; P is the porosity; α is an empirically derived coefficient for which the variation of log N as a function of log $[P+\alpha(1-P)]$ is represented by a substantially straight line; and x is a coefficient representing the slope of this straight line.

In accordance with an important aspect of the invention, the presence of gas in invaded formations can then be detected by comparing the porosities derived from the conversion of the two neutron population measurements with the porosity derived (as it is presently done) from the ratio of these measurements. Advantageously, the presence of gas in the formation under investigation will be detected through the following relationship:

$$\frac{P_{Ratio} - P_F}{P_{Ratio}} > \frac{P_{Ratio} - P_N}{P_{Ratio}};$$

$P_N$ = porosity derived from the near neutron population measurement;
$P_F$ = porosity derived from the far neutron population measurement;
$P_{Ratio}$ = porosity derived from the ratio of the two neutron population measurements.

It is thus possible to obtain an indication of the presence of gas from a dual-detector neutron tool alone. The two converted signals can also be used to provide an indication of the depth of invasion of the formation. The method consists of combining the three porosity readings $P_N$, $P_F$ and $P_{Ratio}$ to produce a signal that represents a combination of the pseudo-geometrical factors for the two detectors of the tool and is therefore representative of the depth of invasion, which can thus be obtained.

The porosity derived from the near neutron population measurement can be combined with the density reading of a two-detector gamma radiation tool to produce an indication of the presence of gas and provide a correction for gas effect. Due to the good compatibility between the density reading and the near porosity reading, the obtained results are much better than those derived using the porosity determined from the ratio of the two neutron population measurements.

There is also provided, in accordance with the present invention, a method of calibration of a dual-detector neutron porosity tool. The neutron population measurements from the two detectors for a given formation are combined to obtain an indication of the formation porosity. Preferably, this porosity indication is derived, in a conventional manner, from the ratio of the two neutron population measurements. The porosity indication is then combined with the corresponding neutron population measurement to determine the relationships that will be used to convert a subsequent borehole neutron population measurement from either one of the two detectors into a porosity indication.

The present invention, both as to its organization and its manner of operation, together with further objects and advantages thereof, may best be understood by reference to the following description taken in connection with the accompanying drawings.

BRIEF DESCRIPTION OF THE DRAWINGS

FIG. 6 is a schematic diagram of a tool embodying the principles of the invention;

FIG. 7 is a graph representing the ratio of the pseudo-geometrical factors for the two detectors of a dual-detector neutron tool as a function of the depth of a saturated formation;

FIG. 8 is a schematic diagram of the circuits used to convert the neutron population measurements into porosity values;

FIG. 9 shows how to obtain the coefficient α;

DESCRIPTION OF THE PREFERRED EMBODIMENTS

Figure 1:
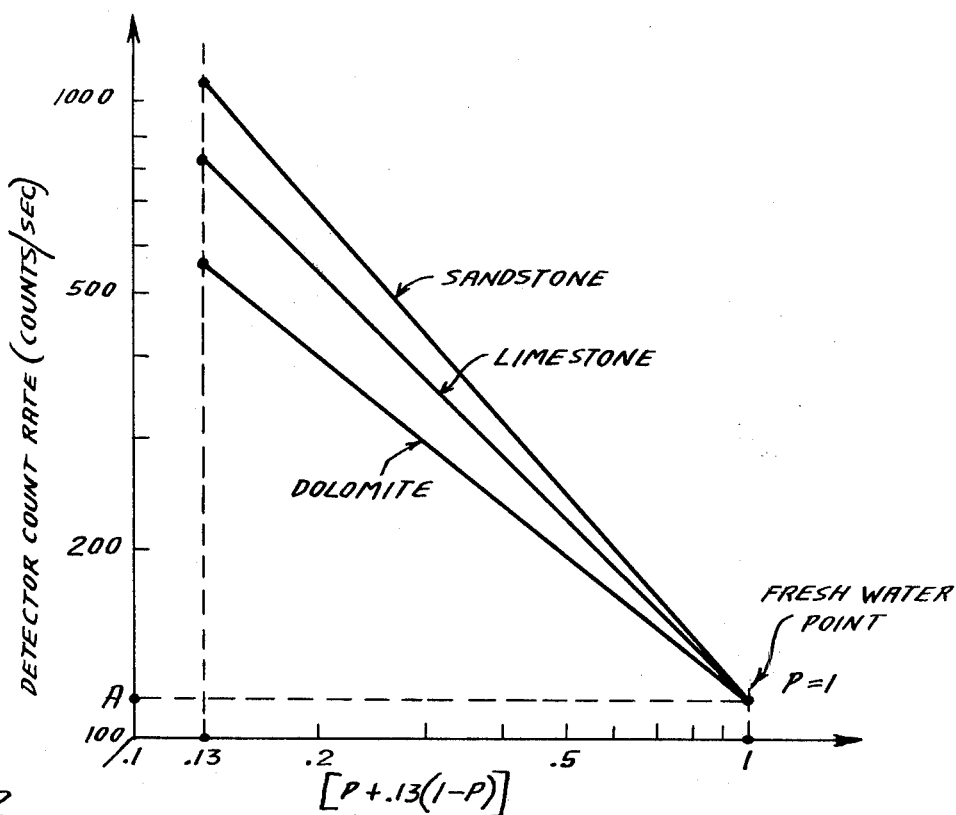
FIG. 1 shows representative logarithmic graphs illustrating the neutron population-porosity dependence.

For a more complete appreciation of the principles and advantages of the present invention, FIG. 1 shows a family of empirically derived straight lines representing the logarithm of the near detector count rate of a dual-detector neutron tool in limestone, sandstone and dolomite formations, as a function of the logarithm of:

$$P + 0.13(1-P),$$

where P is the porosity of the formation. The coefficient 0.13 depends on the source to detector spacing. A similar family of straight lines is obtained for the far detector count rate, with a coefficient 0.08 and different slopes.

The count rate-porosity dependence which is demonstrated by these straight lines can be represented, for the two detectors by a relationship in the form:

$$N = A[P+\alpha(1-p)^{-x} \qquad (1)$$

where N is the measured counting rate; P is the porosity; A is the counting rate measured in fresh water (when P = 1); α is a coefficient for which the variation of log N as a function of:

$$\log[P+\alpha(1-P)]$$

is represented by a straight line; and x, called the porosity resolution factor, is the slope of this straight line, which is independent of the tool.

Figure 2:
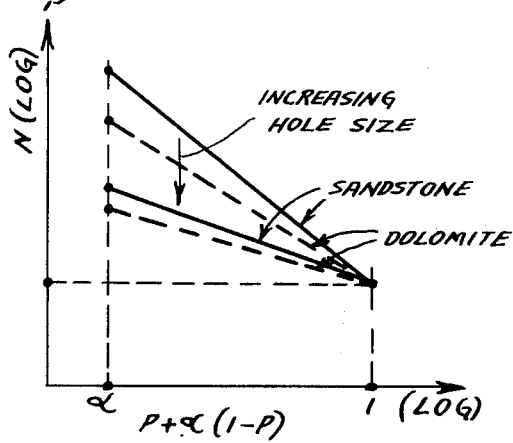
FIGS. 2, 3, 4, and 5 show the respective effects of hole size, borehole fluid salinity, formation water salinity and standoff on the graphs of FIG. 1.
Figure 3:
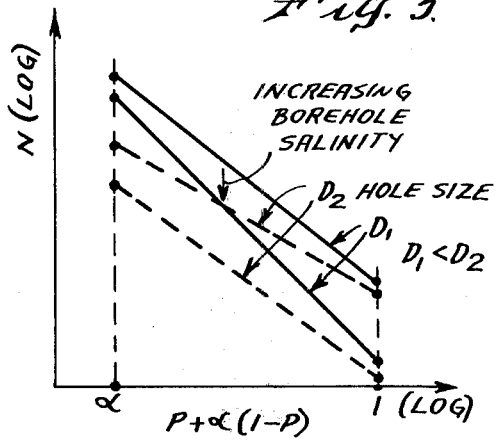
Figure 4:
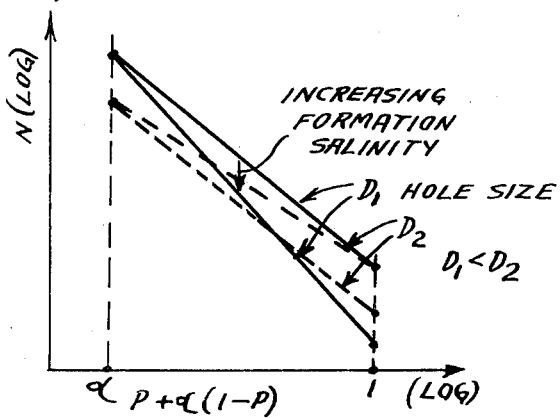

A more complete study of this counting rate-porosity dependence in varying environments has given the following results:

1. Hole size changes are reflected by changes in the porosity resolution factor x without changing the position of the fresh water point. As illustrated by FIG. 2, the slope x decreases with increasing borehole diameter. The variation law depends on the lithology. 2. A variation in the borehole fluid salinity affects both porosity resolution factor x and fresh water counting rate A. As shown in FIG. 3, x increases and A decreases with increasing borehole salinity. The variation law depends on the hole size. 3. A variation in the formation water salinity affects both porosity resolution factor $x$ and fresh water counting rate A. As illustrated by FIG. 4, if the formation water salinity is increased, $x$ is increased and A is decreased, but the point corresponding to P = O is not moved. The variation law depends on the hole size.

Figure 5:
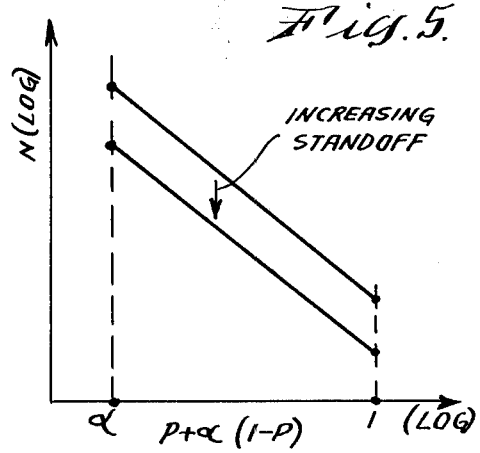

4. The distance the tool is displaced from the borehole wall, or standoff, affects both porosity resolution factor $x$ and coefficient $\alpha$. As this approach may not be very practical for actual application, a fair approximation is to consider that the counting rates are decreased by a constant factor for a given standoff. FIG. 5 illustrates this effect.

In accordance with the invention, the teaching of this discovery is used to develop a method for obtaining a more accurate formation porosity value with a dual-detector neutron tool. An illustrative embodiment of a practical apparatus embodying the principles of the invention is shown in FIG. 6.

A fluid-tight pressure resistant housing 10 is suspended by an armored cable 12 in a borehole 14. Cable 12 comprises insulated conductors that electrically connect the equipment within the housing 10 with a circuit 16 at the earth's surface. A winch (not shown) is located at the surface and is used to lower and raise the housing 10 in the borehole 14 to traverse earth formations 18.

The borehole 14 may be dry or may be filled with drilling mud 20, as shown. To reduce the influence of the mud 20, a decentralizing mechanism, for example, a resiliently activated arm 22, is pivotally attached to the housing 10 and urges its opposite side against the borehole wall to prevent the mud 20 from intervening between housing 10 and formations 18.

A neutron source 24, having a yield of typically 4X10$^7$ n/sec., is placed in the lowermost end of the housing 10 adjacent to the side that abuts the formations 18. Preferably, the source 24 is a "chemical" neutron source, for example a mixture of plutonium and beryllium or americium and beryllium. Because this source is isotropic and emits neutrons with equal probability in all directions, a copper neutron shield 26 is placed around most of it except, of course, the side adjacent to the borehole wall. This shield thus scatters the largest possible number of neutrons toward the adjacent portion of the formations 18 and thereby enhances the statistical accuracy of the measurements.

The neutrons emitted from the source 24 diffuse through the formations 18 and are registered by a short-spaced neutron detector 28 and a long-spaced neutron detector 30 which are mounted within the housing above and generally in alignment with, the source. Typically, these detectors each comprise a hollow cylindrical cathode filled with a neutron sensitive gas, a helium 3 or boron trifluoride for example. An anode wire (not shown) in the center of the gas-filled cylinder creates a voltage gradient through the gas-filled cylinder, that enables ionized nuclear particles, produced as a consequence of neutron absorption within the gas nuclei, to establish charged pulses in the detector electrodes. The long-spaced detector 30 has a much larger volume that the short-spaced detector 28, in order to be more sensitive to neutrons. This arrangement of detectors having different sensitivities is provided to compensate for the exponential decrease in neutron population with separation from the source 24.

Pulses from the detectors 28 and 30 are sent to a downhole signal processor circuit 32 for transmission to the earth surface equipment 16 through two conductors 34 and 36, respectively, in the armored cable 12, after discrimination against noise and amplification.

A borehole size indication is obtained from a caliper 38 combined with the decentralizing arm 22. The caliper 38 transmits to the surface equipment 16, through a conductor 40 in the cable 12, signals that represent the borehole diameter. A standoff indication is obtained from a sensing system 42 mounted between the two neutron detectors on the side of the housing 10 that abuts the formation 18. A system of this sort is described in U.S. Pat. No. 3,023,507 to W. A. Camp, patented Mar. 6, 1962. This system transmits to the equipment 16 through a conductor 44 in the cable 12, signals that represent the displacement of the housing 10 from the borehole wall or standoff.

In the surface equipment 16, the pulses in the conductors 34 and 36 are applied to scalers 46 and 48 respectively that produce signals corresponding to the counting rate $N_N$ of the short-spaced detector 28 and to the counting rate $N_F$ of the long-spaced detector 30. These two signals are transmitted to a circuit 50 that produces an output signal corresponding to apparent neutron porosity $P_{Ratio}$ or the formation derived from the ratio $N_N/N_F$ in a manner similar to that described in U.S. Pat. No. 3,483,376 already cited.

Simultaneously, the signal corresponding to the near counting rate $N_N$ is transmitted to a "near porosity determination circuit" 52 that converts this signal into a near porosity signal $P_N$ through the relationship:

$$N_{Ncor} = A_{Ncor}[P_N + a_N(1-P_N)]^{-x_{Ncor}}$$

with:

$N_{Ncor}$ = near counting rate $N_N$ corrected for standoff effect;

$A_{Ncor}$ = counting rate $A_N$ of the near detector in fresh water, corrected for borehole fluid salinity and formation water salinity effects;

$x_{Ncor}$ = porosity resolution factor of the near detector corresponding to the borehole diameter and lithology and corrected for borehole fluid salinity and formation water salinity effects;

$a_N$ = near detector coefficient.

In a similar manner, the signal corresponding to the far counting rate $N_F$ is transmitted to a "far porosity determination circuit" 54 that converts this signal into a far porosity signal $P_F$ through the relationship:

$$N_{Fcor} = A_{Fcor}[P_F + a_F(1-P_F)]^{31\ x_{Fcor}}$$

with:

$N_{Fcor}$ = far counting rate $N_F$ corrected for standoff effect;

$A_{Fcor}$ = counting rate $A_F$ of the far detector in fresh water, corrected for borehole fluid salinity and formation water salinity effects;

$x_{Fcor}$ = porosity resolution factor of the far detector corresponding to the borehole diameter and lithology, and corrected for borehole fluid salinity and formation water salinity effects;

$a_F$ = far detector coefficient.

A detailed description of the porosity determination circuits 52 and 54 will be given in connection with FIG. 8.

The output signals from the circuit 52 and 54 are transmitted to a recorder 56 in order to produce a graph of $P_N$ and $P_F$ as a function of borehole depth. If the two detectors "see" the same formation, i.e., if there is no invasion, these graphs will be identical ($P_N=P_F$) and reflect the true porosity of the formations. A difference between $P_N$ and $P_F$ will show that effects of invasion are present. In this case, indications of the presence of gas and depth of invasion are provided as follows.

The output signals representative of $P_N$ and $P_{Ratio}$ are transmitted to a subtraction circuit 58 that produces a signal representing the difference $P_{Ratio}-P_N$. This signal is then applied to a division circuit 60 that also receives the signal $P_{Ratio}$ and produces a signal representing the ratio $(P_{Ratio}-P_N)/P_{Ratio}$. In a similar manner, the output signals representative of $P_F$ and $P_{Ratio}$ are transmitted to a subtraction circuit 62 that produces a signal representing the difference $P_{Ratio}-P_R$. This signal is then applied to a division circuit 64 that also receives the signal $P_{Ratio}$ and produces a signal representing the ratio $(P_{Ratio}-P_F)/P_{Ratio}$. The output signals from the division circuits 60 and 64 are finally transmitted to the recorder 56 in order to produce graphs of $(P_{Ratio} - P_N)/P_{Ratio}$ and $(P_{Ratio} - P_F)/P_{Ratio}$ as a function of borehole depth. Visual comparison of these two graphs will enable the log analyst to identify natural gas in the formation through the relationship:

$$\frac{P_{Ratio} - P_F}{P_{Ratio}} > \frac{P_{Ratio} - P_N}{P_{Ratio}}$$

The output signals from the division circuits 60 and 54 can also be applied to a comparison circuit 65 which transmits to the recorder 56 a signal indicating the presence of a gas-bearing formation when the output signal of the division circuit 54 is higher than the output signal of the division circuit 60.

Alternatively, assuming a signal representing the value of the formation density D is available from a two-detector gamma radiation density tool run in the borehole, an indication of the presence of gas in the formations can be obtained through a comparison of D with the near porosity $P_N$ in a circuit 66 according to the rules disclosed in U. S. Pat. No. 3,566,117. As the near porosity $P_N$ corresponds now to a shallow measurement, which is, therefore, more suitable for synergetic use with a density measurement, the comparison of D with $P_N$ will lead to more accurate indications of gas saturation than those derived from the comparison of D with $P_{Ratio}$.

An indication of the depth of invasion of the formations can be obtained from $P_N$, $P_F$ and $P_{Ratio}$, using the graph of FIG. 7, that represents the ratio $G_N/G_F$ of a given dual-detector neutron tool as a function of the thickness of formation saturated, $G_N$ and $G_F$ being the pseudo-geometrical factors for the near and far detectors respectively. The two following equations can be written:

$$P_N = P_S G_N + (1 - G_N) P_D,$$

$$P_F = P_S G_F + (1 - G_F) P_D,$$

with:
$P_S$ = porosity of the saturated zone
$P_D$ = porosity of the dry zone.
The ratio $G_N/G_F$ can thus be expressed by the equation:

$$\frac{G_N}{G_F} = \frac{P_N - P_D}{P_F - P_D}.$$

A fair approximation being to replace $P_D$ by $P_{Ratio}$, it is possible to obtain the value of $G_N/G_F$ from the three porosity readings of the tool $P_N$, $P_F$ and $P_{Ratio}$, then to derive the corresponding depth of invasion from the chart of FIG. 7.

A practical circuit for implementing the above method is represented in FIG. 6. The output signal from the near porosity circuit 52 and the output signal from the ratio porosity circuit 50 are applied to a subtraction circuit 68 that produces a signal representing the difference $P_{N - PRatio}$. In a similar manner, the output signal from the far porosity circuit 54 and the output signal from the ratio porosity circuit 50 are applied to a subtraction circuit 70 that produces a signal representing the difference $P_{F - PRatio}$. The output signals from the subtraction circuits 68 and 70 are transmitted to a division circuit 72 that produces a signal corresponding to the ratio $(P_N - P_{Ratio}/P_F - P_{Ratio})$, i.e., $(G_N/G_F)$. This signal is then applied to a function former 74 providing an input-to-output transfer characteristic that simulates the graph of FIG. 7. Thus, the output signal of the function former 74 represents the depth of invasion. This signal is also transmitted to the recorder 56.

Finally, assuming again a signal representing the value of the formation density D is available from a two-detector gamma radiation density tool run in the borehole, a combination of this signal with the signal representing the near porosity $P_N$ in a circuit 76 according to the method disclosed in the article: "Computer Processed Interpretation of the Rotliegendes Formation", June 1974, Well Evaluation Conference—North Sea, provides a correction for gas effect. Due to the good compatibility between the density reading D and the near porosity reading $P_N$, this correction is more accurate than the correction using the ratio porosity reading $P_{Ratio}$. Thus, accurate porosity measurements can be obtained in invaded gas-bearing formations.

The porosity determination circuits 52 and 54 will now be described in connection with FIG. 3. As these circuits have identical structures, FIG. 8 shows only one of them. It comprises:

- a stage 78 of determination and correction of the porosity resolution factor $x$; $x$ will be $x_N$ for the "near" circuit 52 and $x_F$ for the "far" circuit 54;
- a stage 80 of correction of the fresh water point A; A will be $A_N$ for the "near" circuit 52 and $A_F$ for the "far" circuit 54;
- a stage 82 of correction of the count rate N for the standoff effects;
- a stage 84 of computation of porosity P; P will be $P_N$ for the "near" circuit 52 and $P_F$ for the "far" circuit 54.

In the porosity resolution factor stage 78, the signal in the conductor 40, that represents the borehole diameter as measured by the caliper 38, is applied through a switch 86 to one of three function formers 88, 90 and 92 constructed to provide input-to-output transfer characteristics that simulate curves empirically derived for the two detectors from graphs similar to those of FIG. 2 and give the value of the near or far porosity resolution factor $x$, i.e., the slope of the straight lines, as a function of the borehole diameter in the three common lithologies, limestone, sandstone and dolomite, respectively, for a fresh borehole fluid and a fresh formation water. The appropriate function former is selected by the operator, with the switch 86, as a function of the formation material types expected to be encountered. Alternatively, the switch can be automatically controlled from an apparatus identifying the mineral composition of the formation under investigation, such as described in U. S. Pat. No. 3,566,117 already cited.

Thus, the signal produced by the selected function former in an output conductor 94 represents the near or far porosity resolution factor $x$ corresponding to the mineral composition of the formation and the borehole diameter for a fresh borehole fluid and a fresh formation water.

The borehole diameter signal in the conductor 40 is transmited to a function former 96 that also receives, in a conductor 98, a signal representing the borehole fluid salinity and produces an output signal corresponding to the correct factor $C_1$ by which the porosity resolution factor produced in the conductor 94 should be multiplied in order to take into account the effect of the borehole fluid salinity for the borehole diameter measured by the caliper 38. The function former 96 is constructed to provided an input-to-output transfer characteristic simulating curves empirically derived for the two detectors from graphs similar to those of FIG. 3, that reflect the effects of borehole fluid salinity changes in the slope $x$ of the straight lines for different borehole diameters. The signal representing the borehole fluid salinity is produced by a source 100, the output level of which is adjusted by the operator from a separate measurement of this parameter.

The correction factor signal from the function former 96 and the porosity resolution factor signal produced in the conductor 94 by the selected lithology function former 88, 90 or 92, are both applied to a multiplication circuit 102 that produces an output signal corresponding to the product $x_1 = xC_1$. This signal represents the near or far porosity resolution factor now corrected for the effect of the borehole fluid salinity.

The borehole diameter signal in the conductor 40 is further applied to a function former 104 that also receives, in a conductor 106, a signal representing the formation water salinity and produces an output signal corresponding to the correction factor $C_2$ by which the porosity resolution factor corresponding to a fresh formation water should be multiplied in order to take into account the effect of the formation water salinity for the borehole diameter measured by the caliper 38. The function former 104 is constructed to provide an input-to-output transfer characteristic simulating curves empirically derived for the two detectors from graphs similar to those of FIG. 4, that reflect the effects of formation water salinity changes on the slope $x$ of the straight lines for different borehole diameters. The signals representing the formation water salinity is produced by a source 108, the output level of which is adjusted by the operator from a separate measurement of this parameter.

The correction factor signal from the function former 104 and the porosity resolution factor signal produced by the multiplication circuit 102 are both applied to a multiplication circuit 110 that produces an output signal corresponding to the produce $x_{cor} = x_1 C_2$. This signal represents the near or far porosity resolution factor corrected forthe effects of the borehole fluid salinity and the formation water salinity.

In the fresh water point stage 80, the borehole diameter signal in the conductor 40 is applied to a function former 112 that also receives from the source 100, in a conductor 114, a signal representing the borehole fluid salinity and produces an output signal corresponding to the correction factor $K_1$ by which the fresh water count rate A should be multiplied in order to take into account the effect of the borehole fluid salinity for the borehole diameter measured by the caliper 38. The function former 112 is constructed to provide an input-to-output transfer characteristic simulating curves derived for the two detectors from graphs similar to those of FIG. 3, that reflect the effects of borehole fluid salinity changes on the fresh water point A for different borehole diameters.

Figure 10:
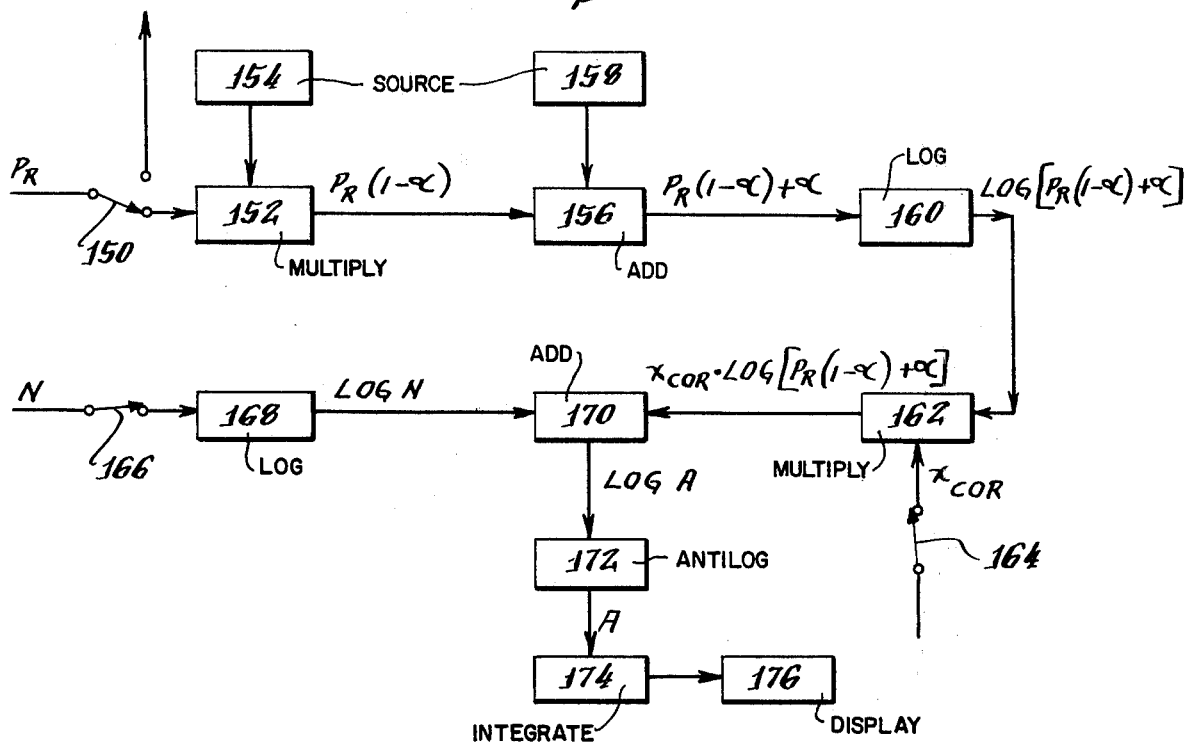
FIG. 10 is a schematic diagram of the circuits used to determine the fresh water point for a detector.

The correction factor signal from the function former 112 and a signal representing the fresh water count rate A provided by an adjustable source 115 are applied to a multiplication circuit 116 that produces an output signal corresponding to the product $A_1 = A.K_1$. This signal represents the near or far fresh water point now corrected for the effect of the borehole fluid salinity. A detailed description of a method for determining the fresh water point A for the two detectors will be given hereafter in connection with FIG. 10.

The borehole diameter signal in the conductor is further applied to a function former 118 that also receives from the source 108, in a conductor 120, a signal representing the formation water salinity and produces an output signal corresponding to the correction factor $K_2$ by which the fresh water count rate A should be multiplied in order to take into account the effect of the formation water salinity for the borehole diameter measured by the caliper 38. The function former 118 is constructed to provide an input-to-output transfer characteristic simulating curves derived for the two detectors from graphs similar to those of FIG. 4, that reflect the effects of formation water salinity changes on the fresh water point A for different borehole diameters.

The correction factor signal from the function former 118 and the fresh water signal produced by the multiplication circuit 116 are both applied to a multiplication circuit 122 that produces an output signal corresponding to the product $A_{cor} = A_1.K_2$. This signal represents the near or far fresh water count rate corrected for the effect of the borehole fluid salinity and the formation water salinity.

In the standoff stage 82, the signal in the conductor 44 representing the standoff as measured by the sensor 42, is applied to a function former 124 that produces an output signal corresponding to the correction factor L by which the count rate N from the scaler 46 or 48 should be multiplied in order to take into account the effect of the standoff. The function former 124 is constructed to provide an input-to-output transfer characteristic simulating a curve derived for the two detectors from graphs similar to those of FIG. 5, that reflect the effects of standoff changes on the count rate N.

The correction factor signal from the function former 124 and the count rate from the scaler 66 or 48 are applied to a multiplication circuit 126 that produces an output signal corresponding to the product $N_{cor} = N.L$. This signal represents the near or far measured count rate corrected for the effects of the standoff.

The output signals from the three stages 78, 80 and 82 are finally transmitted to the porosity computation stage 84 that derives a signal representing the porosity P from the relations:

$$(1/x_{cor})\log (A_{cor}/N_{cor}) = \log [P(1-\alpha) + \alpha]$$

The signal from the stage 82, representing the near or far corrected count rate $N_{cor}$, is applied to the input of a logarithmic amplifier 128 that produces a signal representing the logarithm of $N_{cor}$, log $N_{cor}$. The signal from the stage 80 representing the near or far corrected fresh water count rate $A_{cor}$, is applied to the input of a logarithm amplifier 130 that produces a signal representing the logarithm of $A_{cor}$, log $A_{cor}$. The output signals from these two logarithmic amplifiers are transmitted to a subtraction circuit 132 that produces a signal representing the value log $(A_{cor}/N_{cor})$. This signal and the signal from the stage 78 representing the near or far corrected porosity resolution factor $x_{cor}$, are applied to a division circuit 134 that produces a signal representing the value $(1/x_{cor})$ log $(A_{cor}/N_{cor})$. The output of this circuit is connected to an "anti-log" circuit 136 that produces a signal representing the value the logarithm of which is $(1/x_{cor})$ log $(A_{cor}/N_{cor})$. As shown in the above equation, this value is $P(1-\alpha) + \alpha$. The output signal of the "anti-log" circuit 136 is applied to a subtraction circuit 138 that also receives from a source 140 a signal representing the near or far detector coefficient and produces a signal representing the difference $[P(1-\alpha) + \alpha] - \alpha$, i.e., $P(1-\alpha)$. A practical method for determining this coefficient will be described in connection with FIG. 9. The output signal of the subtraction circuit 138 is transmitted to a division circuit 142 that also receives, from a source 144, a signal representing the value $(1-t0\ \alpha)$ and produces a signal representing the ratio $P(1-\alpha)/(1-\alpha)$, i.e., P. This signal is the near porosity signal $P_N$ or the far porosity signal $P_F$ that are then treated as already described in connection with FIG. 6.

As already mentioned, $\alpha_N$ and $\alpha_F$ (called $\alpha$ in the above description) are two coefficients for which the variation laws of the logarithm of the near and far counting rates $N_N$ and $N_F$ as a function of the logarithm of $P + \alpha_N(1 - P)$ respectively are represented by straight lines. These coefficients are determined once for each of the two detectors of the tool. A simple manual method for determining $\alpha$ for a detector is illustrated by FIG. 9. This method first consists of deriving the curve that represents, in logarithmic coordinates, the variation law of the detector count rate N in formations of known porosity P as a function of P. The straight line L tangent to the curve C at the point $P = 1$ is drawn and the slope $x$ of this line is measured. The coefficient $\alpha$ can then be computed from the equation:

$$(1/x)\log (A/N_o) = \log [P_o] + \alpha (1 - P_o)]$$

with:
$x$ = slope of L;
A = count rate for P = 1;
$N_o$ and $P_o$ = coordinates of any point taken on L.

The fresh water count rate A depends on the detector sensitivity and source strength. Therefore, it must be periodically adjusted. As it has been observed that a direct measurement in water does not give reliable results, a method of indirect determination of the fresh water point for each detector must be used. The two circuits performing this calibration for the near and far detectors appear on FIG. 6 with the reference numbers 146 and 148, respectively. These circuits have the same structure, that will now be described in connection with FIG. 10. The output signal from the porosity determination circuit 50, that corresponds to the porosity $P_{Ratio}$, is applied through a switch 150, to a multiplication circuit 152 that also receives from a source 154 a signal representing $(1-\alpha)$, $\alpha$ being $\alpha_N$ or $\alpha_F$, and thus produces a signal representing $P(1-\alpha)$. This signal is then applied to an addition circuit 156 that receives, from a source 158, a signal representing $\alpha$ and thus produces a signal representing the sum $P(1-\alpha) + \alpha$ which is transmitted to a logarithmic amplifier 160 to derive a signal representing log $[P(1-\alpha) + \alpha]$. This signal is applied to a multiplication circuit 162 that also receives, through a switch 164, from the stage 78 or the appropriate porosity determination circuit 52 or 54, a signal representing the corrected porosity resolution factor $x_{cor}$. The multiplication circuit 162 produces a signal representing:

$$(x_{cor} \log [P(1-\alpha) + \alpha]).$$

At the same time, the output signal from the appropriate scaler 46 or 48 is applied, through a switch 166, to a logarithmic amplifier 168 that produces a signal representing the value log N. This signal and the output signal from the multiplication circuit 168 are finally transmitted to an addition circuit 170 producing a signal that represents the sum:

$$\log N + x_{cor} \log [P)1 - \alpha) + \alpha], \text{ i.e., log A.}$$

An anti-log circuit 172 converts this signal into a signal representing a value of the fresh water count rate A and transmits it to an integrating circuit 174, the output signal of which, representing the mean value of A, is applied to a display device 176.

To determine the fresh water count rate of the two detectors of the tool, the calibration circuits 146 and 148 are put into service by means of the switches 150, 164, 166 and the tool is run in the borehole 14. The values indicated by the display devices 176 of the two calibration circuits 146 and 148 are finally retained as the true fresh water count rates $A_N$ and $A_F$ for the near and far detectors respectively.

Thus, it can be seen that the relationship used to derive a porosity value from the count rate registered by only one of the detectors is determined from the porosity measurements derived from the combined count rates of the two detectors.

Figure 11:
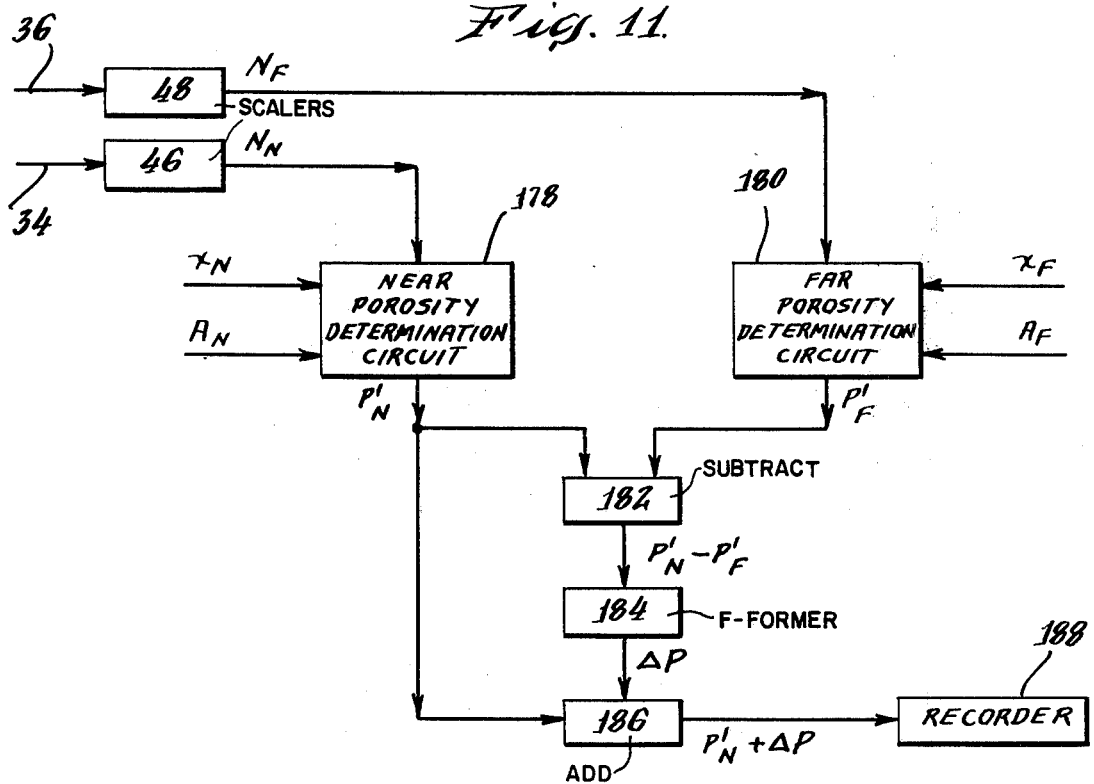
FIG. 11 is a schematic diagram of an alternative circuit for determining formation porosity.

As already mentioned, the conversion of the neutron population measurement of a dual-detector neutron tool in porosity values which are not corrected for environmental effects, such as lithology, borehole size, formation water salinity, borehole fluid salinity and standoff, can be used to determine the true formation porosity by a method similar to that used to derive the formation density from the gamma radiation tool. A practical circuit is represented in FIG. 11.

The output signals from the scalers 46 and 48 are applied directly to porosity computation stages 178 and 180 respectively that are identical to the stage 84 shown in FIG. 8. Each stage receives a signal that represents the near or far porosity resolution factor $x_N$ or $x_F$ corresponding to the lithology and borehole size, such as produced in the conductor 94 of the stage 78 shown in FIG. 8. The stages 178 and 180 receive also a signal representing the fresh water count rate $A_N$ or $A_F$ respectively, such as produced by the source 114 of the stage 80 shown in FIG. 8.

The two porosity computation stages 178 and 180 produce thus output signals that represent near and far porosities $P'_N$ and $P'_F$ respectively, derived from the relationships:

$$N_N = A_N[P_N' + \alpha_N(1 - P_N')]^{-x_N}$$

$$N_F = A_F[P_F' + \alpha_F(1 - P_F')]^{31 \, x_F}$$

These two output signals are applied to a subtraction circuit 182 that produces an output signal representing the difference $P_N' - P_F'$. This signal is then transmitted to a function former 184 providing a transfer characteristic that simulates an empirically derived calibration function giving the value $\Delta P$ that should be added to $P_N'$ as a function of the difference $P_N' - P_F'$ in order to obtain the true formation porosity. The output signal from the near porosity computation stage 178 and the output signal from the function former 184 are applied to an addition circuit 186 that produces an output signal corresponding to $P_N' + \Delta P$. This signal, representing the true formation porosity, is transmitted to a recorder 188.

The signal representing the near porosity $P_N'$ can also be transmitted to the circuits 66 and 76 of FIG. 6 for combination with a signal representing the formation density D produced by a two-detector gamma-radiation density tool.

All the function formers used in the above described circuits preferably take the form of operational amplifiers having resistor-diode networks in the individual amplifier feedback circuits. The gain adjustment provided by these feedback resistances enables the amplifiers to provide the desired input-to-output transfer characteristics.

While there has been described what is at present considered to be preferred embodiments of this invention, it will be apparent to those skilled in the art that various changes and modifications may be made within the spirit and scope of the invention. For example, digital or a combination of digital and analogue circuit equipment could be used in accordance with the invention to produce the results described therein.

What is claimed is:

1. A method for determining characteristics of an earth formation, comprising the steps of:
   producing a first measurement of the neutron population in said formation at a first spacing from a neutron source;
   converting said first measurement into a first signal which is related to the porosity of the formation and corrected for environmental effects;
   producing a second measurement of the neutron population in said formation at a second spacing from said neutron source;
   converting said second measurement into a second signal which is related to the porosity of the formation and corrected for environmental effects; and
   determining from said converted signals characteristics of the formation.

2. The method of claim 1, wherein said determining step comprises the steps of:
   deriving from said first and second measurements a third signal which represents the porosity of the formation; and
   combining said third signal with said first and second converted signals to obtain an indication of the presence of gas in the formation.

3. The method of claim 2, wherein said combining step comprises:
   producing a fourth signal that is functionally related to said first and third signals;
   producing a fifth signal that is functionally related to said second and third signals; and
   comparing said fourth and fifth signals to obtain an indication of the presence of gas in the formation.

4. The method of claim 1, wherein said determining step comprises the steps of:
   deriving from said first and second measurements a third signal which represents the porosity of the formation; and
   combining said third signal with said first and second converted signals to produce an indication of the depth of invasion of the formation.

5. The method of claim 4, wherein said combining step comprises:
   producing a sixth signal that is functionally related to said first, second and third signals, and
   deriving an indication of the depth of invasion of the formation from said sixth signal.

6. The method of claim 5, wherein said invasion depth indication is derived by using an empirical relationship between the thickness of formation saturated and the pseudo-geometrical factors related to said first and second neutron population measurements.

7. The method of claim 1, further comprising the steps of:
   obtaining a signal which represents the density of the formation; and
   comparing this signal with one of said converted signals to obtain an indication of the presence of gas in the formation.

8. The method of claim 1, further comprising the steps of:
   obtaining a signal which represents the density of the formation; and
   combining this signal with one of said converted signals to obtain an indication of the porosity of the formation.

9. A method of calibration of a dual-detector neutron tool for determining the porosity of earth formations, comparing the steps of:
   deriving a value functionally representative of porosity by combining the responses of the two detectors of said tool; and
   combining said value with the response of only one of said detectors to obtain the relationship between porosity and the response of said one detector.

10. An apparatus for determining characteristics of an earth formation from first and second input signals representing the neutron population in said formation at two different spacings from a common neutron source, comprising:
    means for converting said first and second input signals into first and second signals respectively which are related to the formation porosity;
    means for combining said first and second input signals to produce a third signal which represents the formation porosity; and
    means for combining said first, second and third porosity signals to obtain characteristics of the formation.

11. The apparatus of claim 10, wherein said combining means comprises:
    means for producing a fourth signal that is functionally related to said first and third porosity signals;
    means for producing a fifth signal that is functionally related to said second and third porosity signals; and
    means for comparing said fourth and fifth signals to obtain an indication of the presence of gas in the formation.

12. The apparatus of claim 10, wherein said combining means comprises:
 means for producing a sixth signal that is functionally releated to said first, second and third porosity signals; and
 means for deriving an indication of the depth of invasion of the formation from said sixth signal.

13. The apparatus of claim 10, further comprising:
 means for obtaining a signal which represents the density of the formation; and
 means for comparing said density signal with one of said first and second porosity signals to obtain an indication of the presence of gas in the formation.

14. The apparatus of claim 10, further comprising:
 means for obtaining a signal which represents the density of the formation; and
 means for combining said density signal with one of said first and second porosity signals to obtain an indication of the porosity of the formation.

15. A method for determining a characteristic of an earth formation, comprising the steps of:
 producing first and second measurements of the neutron population in said formation at two different spacings from a neutron source;
 converting said first and second measurements into first and second signals respectively which are related to the porosity of the formation;
 deriving from said first and second measurements a third signal which represents the porosity of the formation; and
 combining said first, second and third porosity signals to obtain an indication of the depth of invasion of the formation.

16. The method of claim 15, further comprising the steps of:
 obtaining a signal which represents the density of the formation; and
 comparing said density signal with one of said first and second porosity signals to obtain an indication of the presence of gas in the formation.

17. The method of claim 15, further comprising the steps of:
 obtaining a signal which represents the density of the formation; and
 combining said density signal with one of said first and second porosity signals to obtain an indication of the porosity of the formation.

18. A method of calibrating a dual-detector neutron tool for determining the porosity of earth formations from the response of a selected one of the two detectors of the tool, comprising the steps of:
 combining the responses of the two detectors of the tool to derive a value functionally representative of porosity; and
 calibrating the tool by determining a detector sensitivity and source strength parameter for the selected one of the two detectors from said porosity value in accordance with a predetermined relationship.

19. A method of calibration of a dual-detector neutron tool for determining the porosity of earth formations from the response of only one of the two detectors of the tool through a relationship that includes a parameter related to the detector sensitivity and the strength of the neutron source, comprising the steps of:
 deriving indications of the porosity of earth formations from the responses of the two detectors of the tool;
 obtaining values of said strength source parameter by solving said relationship from said porosity indications; and
 determining the mean value of said parameter.

* * * * *

UNITED STATES PATENT AND TRADEMARK OFFICE
CERTIFICATE OF CORRECTION

PATENT NO. : 4,047,027　　　　　　　　　　　Page 1 of 3
DATED : 9/6/77
INVENTOR(S) : Richard M. Bateman & Christian M. Clavier It is certified that error appears in the above—identified patent and that said Letters Patent are hereby corrected as shown below:

Col. 2, line 12 delete "detector neutron porosity".

Col. 2, line 13 delete "tool and a two detector gamma radiation"

Col. 2, line 21 delete "formation from the count rates of two detectors".

Col. 2, line 22 delete "located".

Col. 2, line 56 change "sured" to --surement--.

Col. 2, line 56 delete "the".

Col. 2, line 56 after "represents" insert --the--.

Col. 3, line 27 insert --with: --.

Col. 4, line 45 change "(1-p)" to --(1-P)--.

Col. 4, line 45 after "(1-P)" insert --]--.

Col. 5, line 35 change "4x107" to --$4 \times 10^7$--.

Col. 5, line 60 change "that" to --than--.

Col. 6, line 23 change "or" to --of--.

Col. 6, line 48 delete "31".

Col. 7, line 14 change "$P_R$" to --$P_F$--.

UNITED STATES PATENT AND TRADEMARK OFFICE
CERTIFICATE OF CORRECTION

PATENT NO. : 4,047,027

DATED : 9/6/77

INVENTOR(S) : Richard M. Bateman & Christian M. Clavier

It is certified that error appears in the above-identified patent and that said Letters Patent are hereby corrected as shown below:

Col. 7, line 20 change "$(P_{Ratio}-P_F)/PRatio$" to --$(P_{Ratio}-P_F)/P_{Ratio}$--.

Col. 7, line 29 change " 54 " to -- 64 --.

Col. 8, line 11 change "PRatio" to --$P_{Ratio}$--.

Col. 8, line 15 change "PRatio" to --$P_{Ratio}$--.

Col. 8, line 17 after "to" insert --(--.

Col. 8, line 40 change "3" to --8--.

Col. 9, line 17 change "correct" to --correction--.

Col. 9, line 22 change "provided" to --provide--.

Col. 9, line 54 change "nals" to --nal--.

Col. 9, line 62 change "produce" to --product--.

Col. 9, line 64 change "forthe" to --for the--.

Col. 10, line 65 change "relations:" to --relationship:--.

Col. 11, line 28 delete "t0".

Col. 11, line 37 after "$P+\alpha_N(1-P)$" insert --and $P+\alpha_F(1-P)$--.

Col. 11, line 48 after "$[P_o$" delete ")".

UNITED STATES PATENT AND TRADEMARK OFFICE
CERTIFICATE OF CORRECTION

PATENT NO. : 4,047,027         Page 3 of 3
DATED      : 9/6/77
INVENTOR(S) : Richard M. Bateman & Christian M. Clavier It is certified that error appears in the above—identified patent and that said Letters Patent are hereby corrected as shown below:

Col. 12, line 12 after "($x_{cor}$" insert " · ".

Col. 13, line 1 delete "31" and insert -- - --.

Signed and Sealed this

Nineteenth Day of September 1978

[SEAL]

Attest:

RUTH C. MASON
*Attesting Officer*

DONALD W. BANNER
*Commissioner of Patents and Trademarks*